United States Patent
Li et al.

(10) Patent No.: US 12,411,460 B2
(45) Date of Patent: Sep. 9, 2025

(54) SEQUENTIAL ACTION DEVICE AND SOLID-STATE STARTER AND SOLID-STATE CIRCUIT BREAKER INCLUDING THEREOF

(71) Applicant: Schneider Electric (China) Co., Ltd., Beijing (CN)

(72) Inventors: Xiaoqiang Li, Shanghai (CN); Qing Yang, Shanghai (CN); Ying Shi, Shanghai (CN); Shunxian Mao, Shanghai (CN); Junqi Xiang, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 53 days.

(21) Appl. No.: 18/519,598

(22) Filed: Nov. 27, 2023

(65) Prior Publication Data
US 2025/0036088 A1 Jan. 30, 2025

(30) Foreign Application Priority Data
Jul. 24, 2023 (CN) .......................... 202321956055.0

(51) Int. Cl.
*G05B 11/01* (2006.01)
(52) U.S. Cl.
CPC .................... *G05B 11/01* (2013.01)
(58) Field of Classification Search
CPC ........ G05B 11/01; H01H 9/547; H01H 9/548; H01H 33/59
See application file for complete search history.

(56) References Cited

U.S. PATENT DOCUMENTS

| | | | |
|---|---|---|---|
| 11,521,808 B2 * | 12/2022 | Degli Innocenti | ..... H01H 9/548 |
| 2015/0303676 A1 | 10/2015 | Hertz et al. | |
| 2020/0365346 A1 | 11/2020 | Telefus et al. | |

FOREIGN PATENT DOCUMENTS

| | | |
|---|---|---|
| EP | 2234136 A1 | 9/2010 |
| EP | 3945537 A1 | 2/2022 |

OTHER PUBLICATIONS

Extended European Search Report dated Apr. 24, 2024 for corresponding European Patent Application No. 23211975.0-1201, 13 pages.

* cited by examiner

*Primary Examiner* — Jeffrey M Shin
(74) *Attorney, Agent, or Firm* — Troutman Pepper Locke LLP

(57) ABSTRACT

The present disclosure relates to an electromechanical sequential action device that is capable of sequentially interlocking a mechanical switch and a power electronic switch, where through an action sequence control, the electromechanical mechanism turns on the power electronic switch only after the mechanical switch is closed, and through an advanced travel control, turns off the power electronic switch before opening the mechanical switch, avoiding the problem of arc discharge during closing and opening of the mechanical switch, and improving the service life and connection reliability of the mechanical switch.

8 Claims, 1 Drawing Sheet

SEQUENTIAL ACTION DEVICE AND SOLID-STATE STARTER AND SOLID-STATE CIRCUIT BREAKER INCLUDING THEREOF

CROSS-REFERENCE TO RELATED APPLICATIONS

This application claims the benefit of priority of China Utility Model Application No. 202321956055 filed Jul. 24, 2023 the content of which is incorporated by reference herein in its entirety.

TECHNICAL FIELD

The present utility model relates to a solid-state starter and a solid-state circuit breaker, and in particular, to a sequential action device used for a power electronic switch and an isolating mechanical switch in a solid-state starter and a solid-state circuit breaker, and to a solid-state starter and a solid-state circuit including the sequential action device, wherein a power electronic switch and an isolating mechanical switch are connected in series in a main circuit.

BACKGROUND

The opening and closing of most mechanical switches on the market are controlled by control loops. In the process of the opening and closing of the mechanical switches, arc discharge may occur in contact systems of the mechanical switches, compromising the service life of contacts and the contact reliability.

In a circuit that uses a power electronic device as a switching device, the switching device is directly controlled by a control unit to control the turning off and turning on of the power electronic switch.

In a circuit with a mechanical switch and a power electronic switch connected in series, the electronic switch generally turns off and turns on frequently, and the mechanical switch opens and closes under other conditions. However, as there is no sequential interlock between the mechanical switch and the electronic switch, arc discharge still occurs during the opening and closing of the mechanical switch, which reduces the life and reliability of the mechanical switch.

Therefore, for a circuit with a mechanical switch and a power electronic switch connected in series, such as a solid-state starter and a solid-state circuit breaker, it is desirable for an sequential action device for the mechanical switch and the power electronic switch, thereby preventing arc discharge during the closing and opening of the mechanical switch, and improving the service life and connection reliability of the mechanical switch.

SUMMARY

A sequential action device for a power electronic switch and a mechanical switch connected in series in a main circuit is disclosed. The sequential action device includes: a mechanical operating mechanism, wherein the mechanical switch is opened/closed based on a position of the mechanical operating mechanism; a power electronic switch software control circuit and a power electronic switch drive circuit that control the power electronic switch to turn on/turn off, where the power electronic switch software control circuit controls the power electronic switch drive circuit to control the power electronic switch to turn on/turn off; a triggering device configured to based on the position of the mechanical operating mechanism, sending a signal that allows for turning on/turning off to the power electronic switch software control circuit to control an action of the power electronic switch drive circuit; a detection circuit configured to detect whether the mechanical switch is closed, wherein when the detection circuit detects that the mechanical switch is closed, the detection circuit sends a signal that allows for turning on to the power electronic switch software control circuit, wherein during a power-on of the main circuit, the turning on of the power electronic switch and the closing of the mechanical switch are sequentially acted, and during a power-off of the main circuit, the turning off of the power electronic switch and the opening of the mechanical switch are sequentially acted.

The triggering device further controls the turning on/turning off of the power electronic switch drive circuit.

The sequential action during the power-on of the main circuit means that the mechanical switch is closed first, and then the power electronic switch is turned on. The sequential action during the power-off of the main circuit means that the power electronic switch is turned off first, and then the mechanical switch is opened.

The triggering device is embodied by one of a micro switch, a grating sensor, and a Hall sensor.

During a power-on, the mechanical switch is in an opened state and the triggering device is in a turned off state, based on a third position of the mechanical operating mechanism; the mechanical switch closes based on a second position of the mechanical operating mechanism, and the triggering device is in the turned off state based on the second position of the mechanical operating mechanism; the mechanical switch is in a closed state and the triggering device is in a turned on state, based on a first position of the mechanical operating mechanism.

During a power-off, the mechanical switch is in a closed state and the triggering device is in a turned on state based on a first position of the mechanical operating mechanism; the mechanical switch remains in a closed state based on a second position of the mechanical operating mechanism, and the triggering device is in an turned off state based on the second position of the mechanical operating mechanism; the mechanical switch begins to open based on a third position of the mechanical operating mechanism, and the triggering device is in the turned off state based on the third position of the mechanical operating mechanism.

A solid-state starter is disclosed, which incudes a sequential action device as described above.

A solid-state circuit breaker is disclosed, which includes a sequential action device as described above.

BRIEF DESCRIPTION OF DRAWINGS

Aspects and advantages of the present disclosure will become apparent and readily understood from the following description of embodiments with reference to the accompanying drawings, where.

DETAILED DESCRIPTION

The present utility model is described in detail below with reference to exemplary embodiments of the present utility model. However, the present utility model is not limited to the embodiments described herein, which may be implemented in many different forms. The described embodiments are intended only to make the present disclosure complete and thorough, and comprehensively convey the idea of the present utility model to those skilled in the art. The features of the described embodiments may be combined or substituted with each other, unless expressively excluded or otherwise expressed in the context.

In the embodiments of the present utility model, unless otherwise expressly stated, the "connection" as used herein does not necessarily mean that "direct connection" or "direct contact", but only electrical connectivity instead. In addition, phrases such as the "first", "second" and so on as used herein are only used to distinguish parts. They do not indicate any priority or ordering, or whether the parameter values of the two parts are the same or different.

Generally, mechanical switches on the market are opened or closed through control systems. In such opening or closing process, arc discharge may occur in contacts of the mechanical switches, compromising the service life of the mechanical switches and contact reliability of the contacts.

The power electronic switches on the market are mainly used to turn on/turn off quickly, and do not have the function of isolating a circuit.

If circuit isolation is required, an isolating mechanical switch needs to be connected in series to the power electronic switching module. During an opening or an closing of the isolating mechanical switch, the following steps needs to be performed.

Closing: Close the isolating mechanical switch first, and then turn on the power electronic switch.

Opening: Turn off the power electronic switch first, and then open the isolating mechanical switch.

Incorrect operation or sequence may easily cause arc discharge of the isolating mechanical switch, compromising the service life and connection reliability, and even leading to safety hazards.

The present application is applied in a scenario where the power electronic switch and the isolating mechanical switch are connected in series in a circuit, such as a circuit including a solid-state starter and a solid-state circuit breaker. Through a sequential control logic that actuates the power electronic switch and the mechanical switch sequentially, the power electronic switch can be turned on only after the mechanical switch is closed, and is turned off before the mechanical switch is opened. In this way, the arc discharge of the mechanical switch may be avoided, improving the service life and reliability of the mechanical switch, and enhancing safety.

Figure 1:
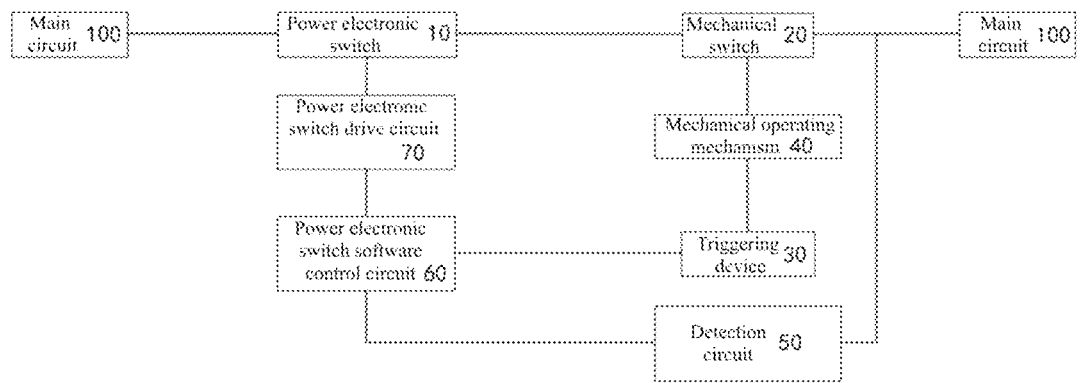
FIG. 1 shows a schematic diagram of a sequential action device for a power electronic switch and a mechanical switch according to a first embodiment of the present utility model.

FIG. 1 shows a schematic diagram of a sequential action device for a power electronic switch and a mechanical switch according to a first embodiment of the present utility model.

As shown in FIG. 1, a sequential action device for a power electronic switch 10 and a mechanical switch 20 according to the first embodiment of the present utility model includes: a triggering device 30, a mechanical operating mechanism 40, a detection circuit 50, a power electronic switch software control circuit 60, and a power electronic switch drive circuit 70.

As shown in FIG. 1, the power electronic switch 10 and the mechanical switch 20 are connected in series in a main circuit 100. The mechanical operating mechanism 40 triggers an opening/closing action of the mechanical switch 20. The power electronic switch software control circuit 60 controls the power electronic switch drive circuit 70 to control the power electronic switch 10 to turn on/turn off. The detection circuit 50 detects whether the mechanical switch 20 is closed.

The triggering device 30 is embodied, for example, by a micro switch, a grating sensor, a Hall sensors or another sensor. The triggering device 30 is in an open/closed state, based on a position of the mechanical operating mechanism 40 that is sensed by a sensor. The triggering device 30 may be considered to play the role of a switching signal.

Generally, the mechanical operating mechanism 40 has different control positions. In a first position, the mechanical operating mechanism 40 places both the mechanical switch 20 and the triggering device 30 in a closed state. In a second position, the mechanical operating mechanism 40 makes the mechanical switch 20 to close, and place the triggering device 30 in an opened state. In a third position, the mechanical operating mechanism 40 makes the mechanical switch 20 to open, and place the triggering device 30 in an opened state.

According to the first embodiment of the present utility model, during a power-on of the main circuit, the power electronic switch 10 is turned on from an initial turned off state and the mechanical switch 20 is closed from an initial opened state, where the mechanical switch 20 is closed first, and then the power electronic switch 10 is turned on.

During the power-on of the main circuit, the mechanical operating mechanism 40 unidirectionally changes from the third position to the second position and then to the first position.

During the power-on of the main circuit, when the mechanical operating mechanism 40 is in the third position, both the triggering device 30 and the mechanical switch 20 are in an opened state.

As the triggering device 30 is opened, the triggering device 30 sends a signal that allows for turning off to the power electronic switch software control circuit 60, and the power electronic switch software control circuit 60 sends an turning off command to the power electronic switch drive circuit 70 to maintain the power electronic switch 10 in the initial turned off state.

Meanwhile, the detection circuit 50 detects that the mechanical switch 20 is opened, and the detection circuit 50 sends a signal that allows for turning off to the power electronic switch software control circuit 60. The power electronic switch software control circuit 60 sends an turning off command to the power electronic switch drive circuit 70 to maintain the power electronic switch 10 in the initial turned off state.

At this time, the power electronic switch 10 is in the turned off state and the mechanical switch 20 are in the opened state.

During the power-on of the main circuit, when the mechanical operating mechanism 40 is in the second position, the power electronic switch 10 remains in the turned off state, and the mechanical operating mechanism 40 opens the triggering device 30 and closes the mechanical switch 20.

During the power-on of the main circuit, when the mechanical operating mechanism 40 is in the first position, the mechanical switch 20 is already closed, and the triggering device 30 is changed into the closed state based on the first position. In other words, the mechanical switch 20 is closed before the triggering device 30 is closed.

When the detection circuit 50 detects that the mechanical switch 20 is closed, the detection circuit 50 sends a signal that allows for turning on to the power electronic switch software control circuit 60.

When the triggering device 30 is closed, the triggering device 30 sends a signal that allows for turning on to the power electronic switch software control circuit 60.

The power electronic switch software control circuit 60 then sends a turning on command to the power electronic switch drive circuit 70, and the power electronic switch drive circuit 70 drives the power electronic switch 10 to turn on the power electronic switch 10 after receiving the turning on command.

Thus, the sequential action device for the mechanical switch 20 and the power electronic switch 10 according to the first embodiment of the present utility model may sequentially actuate the turning on of the power electronic switch 10 and the closing of the mechanical switch 20 during a power-on of the main circuit, that is, first close the mechanical switch 20, and then turn on the power electronic switch 10.

During the power-off of the main circuit, the power electronic switch 10 according to the first embodiment of the present utility model is turned off from the initial turning off state, the mechanical switch 20 according to the first embodiment of the present utility model is opened from the initial closing state where the power electronic switch 10 is first turned off, and then the mechanical switch 20 is opened.

During the power-off of the main circuit, the mechanical operating mechanism 40 unidirectionally changes from the first position to the second position and then to the third position.

During the power-off of the main circuit, when the mechanical operating mechanism 40 is in the first position, both the mechanical switch 20 and the triggering device 30 are in the closed state.

During the power-off of the main circuit, when the mechanical operating mechanism 40 is in the second position, the mechanical operating mechanism 40 opens only the triggering device 30. At this time, the mechanical switch 20 remains closed.

Once the triggering device 30 is in the opened state, it sends a signal that allows for turning off to the power electronic switch software control circuit 60, and the power electronic switch software control circuit 60 then sends an turning off command to the power electronic switch drive circuit 70. The power electronic switch drive circuit 70 drives the power electronic switch 10 to turn off the power electronic switch 10 after receiving the turning off command.

During the power-off of the main circuit, when the mechanical operating mechanism 40 is in the third position, the triggering device 30 remains in the opened state based on the third position. The mechanical switch 20 begins to open based on the third position. At this time, the power electronic switch 10 is turned off long before the mechanical switch 20 begins to open.

In addition, when the detection circuit 50 detects that the mechanical switch 20 is opened, the detection circuit 50 sends a signal that allows for turning off to the power electronic switch software control circuit 60.

This ensures that the power electronic switch 10 is turned off before the opening of the mechanical switch 20.

Thus, the sequential action device for the mechanical switch 20 and the power electronic switch 10 according to the first embodiment of the present utility model may sequentially actuate the turning off of the power electronic switch 10 and the opening of the mechanical switch 20 during a power-off of the main circuit, that is, first turn off the power electronic switch 10, and then open the mechanical switch 20.

Figure 2:
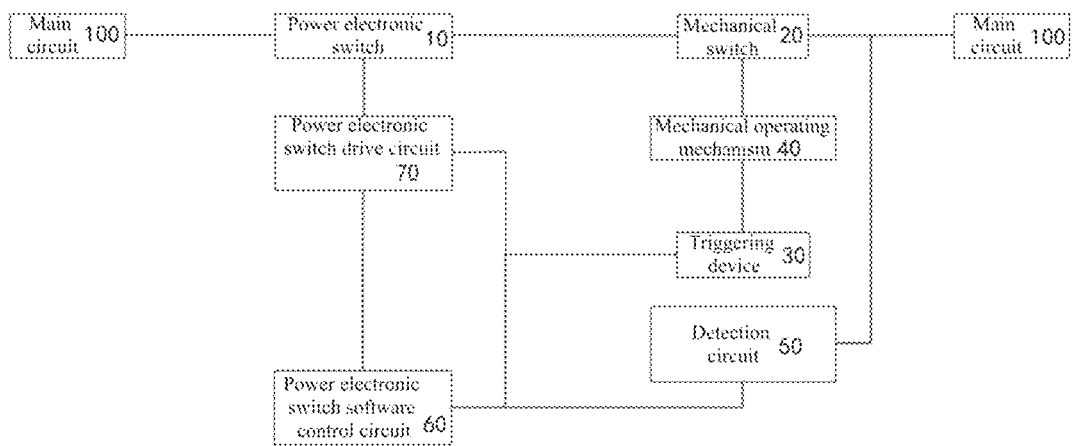
FIG. 2 shows a schematic diagram of a sequential action device for a power electronic switch and a mechanical switch according to a second embodiment of the present utility model.

FIG. 2 shows a schematic diagram of a sequential action device for a power electronic switch and a mechanical switch according to a second embodiment of the present utility model.

FIG. 2 and FIG. 1 are substantially the same, except that in FIG. 2, an output of the triggering device 30 acts both on the power electronic switch drive circuit 70 and the power electronic switch software control circuit 60, respectively, while in FIG. 1, an output of the triggering device 30 only acts on the power electronic switch software control circuit 60.

As the triggering device 30 of FIG. 2 may actuate the power electronic switch drive circuit 70 and the power electronic switch software control circuit 60 respectively, the power electronic switch 10 may be turned off/turned on more reliably.

In FIG. 2, the triggering device 30 may be embodied by a micro switch, a grating sensor, a Hall sensor or another sensor. The triggering device 30 is in the opened/closed state based on sensing of a position of the mechanical operating mechanism 40 by a sensor. The triggering device 30 may be considered to act as a switching signal, which on the one hand is connected in series within the drive circuit 70 of the power electronic switch 10. If the switching signal is not in the closed state, the drive circuit 70 of the power electronic switch 10 may not be turned on, and therefore cannot drive the power electronic switch 10. When the triggering device 30 is in the closed state, it turns on the drive circuit 70 of the power electronic switch 10. When the triggering device 30 is in the opened state, it turns off the drive circuit 70 of the power electronic switch 10. On the other hand, as described in FIG. 1, the triggering device 30 sends a signal that allows for turning off/turning on to the power electronic switch software control circuit 60.

According to the second embodiment of the present utility model, during the power-on of the main circuit, the power electronic switch 10 turns on from an initial turned off state, the mechanical switch 20 closes from an initial opened state, where the mechanical switch 20 is closed first, and then the power electronic switch 10 is turned on.

During the power-on of the main circuit, the mechanical operating mechanism 40 unidirectionally changes from the third position to the second position and then to the first position.

During the power-on of the main circuit, when the mechanical operating mechanism 40 is in the third position, both the triggering device 30 and the mechanical switch 20 are in an opened state. As the triggering device 30 is opened, the power electronic switch drive circuit 70 of the power electronic switch 10 turns off, which further turns off the power electronic switch 10. At this time, both the power electronic switch 10 is in a turned off state and the mechanical switch 20 is in an opened state.

Meanwhile, as the triggering device 30 is opened, the triggering device 30 sends a signal that allows for turning off to the power electronic switch software control circuit 60, and the power electronic switch software control circuit 60 sends a turning off command.

Meanwhile, the detection circuit 50 detects that the mechanical switch 20 is opened, and the detection circuit 50 sends a signal that allows for turning off to the power electronic switch software control circuit 60. The power electronic switch software control circuit 60 sends a turning off command to the power electronic switch drive circuit 70.

During the power-on of the main circuit, when the mechanical operating mechanism 40 is in the second position, the power electronic switch 10 remains in the turned off state, and the mechanical operating mechanism 40 opens the triggering device 30 and closes the mechanical switch 20.

During the power-on of the main circuit, when the mechanical operating mechanism 40 is in the first position, the mechanical switch 20 is already closed, and the triggering device 30 is changed into the closed state based on the first position. In other words, the mechanical switch 20 is closed before the triggering device 30 is closed.

At this time, the triggering device 30 is in the closed state, which further turns on the drive circuit 70 of the power electronic switch 10.

Meanwhile, as the triggering device 30 is closed, the triggering device 30 sends a signal that allows for turning on to the power electronic switch software control circuit 60, and the power electronic switch software control circuit 60 sends a turning on command.

In addition, when the detection circuit 50 detects that the mechanical switch 20 is closed, the detection circuit 50 sends a signal that allows for turning on to the power electronic switch software control circuit 60.

The power electronic switch software control circuit 60 then sends a turning on command to the power electronic switch drive circuit 70 that has been turning on, and the power electronic switch drive circuit 70 drives the power electronic switch 10 to turn on the power electronic switch 10 after receiving the turning on command.

Thus, the sequential action device for the mechanical switch 20 and the power electronic switch 10 according to the second embodiment of the present utility model may sequentially actuate the turning on of the power electronic switch 10 and the closing of the mechanical switch 20 during the power-on of the main circuit, that is, first close the mechanical switch 20, and then turn on the power electronic switch 10.

During the power-off of the main circuit, the power electronic switch 10 according to the second embodiment of the present utility model is turned off from the initial turning on state, the mechanical switch 20 according to the second embodiment of the present utility model is opened from the initial closing state, where the power electronic switch 10 is first turned off, and then the mechanical switch 20 is opened.

During the power-off of the main circuit, the mechanical operating mechanism 40 unidirectionally changes from the first position to the second position and then to the third position.

During the power-off of the main circuit, when the mechanical operating mechanism 40 is in the first position, both the mechanical switch 20 and the triggering device 30 are in the closed state.

During the power-off of the main circuit, when the mechanical operating mechanism 40 is in the second position, the mechanical operating mechanism 40 opens only the triggering device 30. At this time, the mechanical switch 20 remains closed.

Once the triggering device 30 is in the opened state, it turns off the drive circuit 70 of the power electronic switch 10. This further turns off the power electronic switch 10.

Meanwhile, once the triggering device 30 is opened, it sends a signal that allows for turning off to the power electronic switch software control circuit 60, and the power electronic switch software control circuit 60 further sends a turning off command to turning off the power electronic switch 10.

This ensures that the power electronic switch 10 is turned off before the opening of the mechanical switch 20.

During the power-off of the main circuit, when the mechanical operating mechanism 40 is in the third position, the triggering device 30 remains in the opened state based on the third position. The mechanical switch 20 begins to open based on the third position. At this time, the power electronic switch 10 is turned off long before the mechanical switch 20 begins to open.

Thus, the sequential action device for the mechanical switch 20 and the power electronic switch 10 according to the second embodiment of the present utility model may sequentially actuate the turning off of the power electronic switch 10 and the opening of the mechanical switch 20 during a power-off of the main circuit, that is, first turn off the power electronic switch 10, and then open the mechanical switch 20.

Through a sequential control logic that sequentially interlocks a mechanical switch and a power electronic switch, the sequential action device for a mechanical switch and a power electronic switch according to the present utility model is able to ensure that the power electronic switch is turned on only after the mechanical switch is closed, and is turned off before the mechanical switch is opened. In this way, the arc discharge of the mechanical switch may be avoided, improving the service life and reliability of the mechanical switch, and enhancing safety.

The block diagrams of circuits, instruments, devices, apparatuses, and systems involved in the present utility model are only used as exemplary examples and are not intended to require or imply that they must be connected, arranged, and configured in the manner shown in the block diagrams. As it may be appreciated by those skilled in the art, these circuits, instruments, devices, apparatuses, and systems may be connected, arranged, and configured in any manner, as long as the desired purpose can be achieved.

Those skilled in the art may understand that the above embodiments are only exemplary and not limiting, and embodiments of the present utility model may be modified, combined, partially combined and replaced according to design requirements and other factors, as long as they fall within the scope of the appended claims or their equivalent, that is, within the patentable scope claimed by the present utility model.

The invention claimed is:

1. A sequential action device for a power electronic switch and a mechanical switch connected in series in a main circuit, comprising:
    a mechanical operating mechanism, wherein the mechanical switch is opened/closed based on a position of the mechanical operating mechanism;
    a power electronic switch software control circuit and a power electronic switch drive circuit that control the power electronic switch to turn on/turn off, where the power electronic switch software control circuit controls the power electronic switch drive circuit to control the power electronic switch to turn on/turn off;
    a triggering device that based on a position of the mechanical operating mechanism, sending a signal that allows for turning on/turning off to the power electronic switch software control circuit to control an action of the power electronic switch drive circuit;
    a detection circuit that detects whether the mechanical switch is closed, wherein when the detection circuit detects that the mechanical switch is closed, the detection circuit sends a signal that allows for turning on to the power electronic switch software control circuit,
    wherein during a power-on of the main circuit, the turning on of the power electronic switch and the closing of the mechanical switch are sequentially acted, and during a power-off of the main circuit, the turning off of the power electronic switch and the opening of the mechanical switch are sequentially acted.

2. The sequential action device according to claim 1, wherein:
the triggering device further controls the turning on/turning off of the power electronic switch drive circuit.

3. The sequential action device according to claim 1, wherein:
the sequential action during the power-on of the main circuit means that the mechanical switch is closed first, and then the power electronic switch is turned on;
the sequential action during the power-off of the main circuit means that the power electronic switch is turned off first, and then the mechanical switch is opened.

4. The sequential action device according to claim 1, wherein:
the triggering device is embodied by one of a micro switch, a grating sensor, and a Hall sensor.

5. The sequential action device according to claim 1, wherein:
during a power-on,
the mechanical switch is in an opened state and the triggering device is in a turned off state, based on a third position of the mechanical operating mechanism;
the mechanical switch closes based on a second position of the mechanical operating mechanism, and the triggering device is in the turned off state based on the second position of the mechanical operating mechanism;
the mechanical switch is in a closed state and the triggering device is in a turned on state, based on a first position of the mechanical operating mechanism.

6. The sequential action device according to claim 1, wherein:
during a power-off,
the mechanical switch is in a closed state and the triggering device is in a turned on state based on a first position of the mechanical operating mechanism;
the mechanical switch remains in a closed state based on a second position of the mechanical operating mechanism, and the triggering device is in a turned off state based on the second position of the mechanical operating mechanism;
the mechanical switch begins to open based on a third position of the mechanical operating mechanism, and the triggering device is in the turned off state based on the third position of the mechanical operating mechanism.

7. A solid-state starter comprising the sequential action device according to claim 1.

8. A solid-state circuit breaker comprising the sequential action device according to claim 1.

* * * * *